Figure 4:
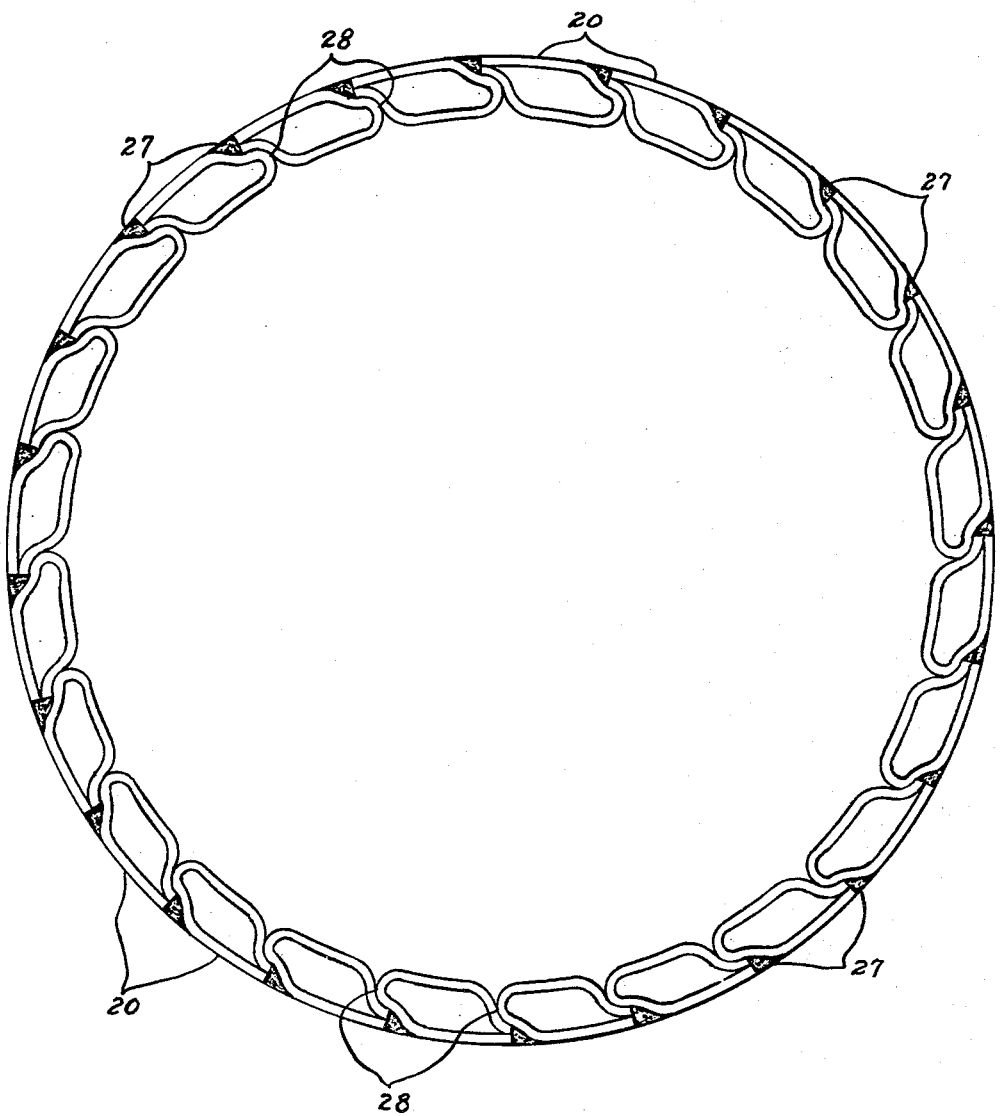

April 13, 1965  I. E. ROSMAN  3,177,935
COOLING TUBE STRUCTURE
Filed Dec. 17, 1963  2 Sheets-Sheet 1
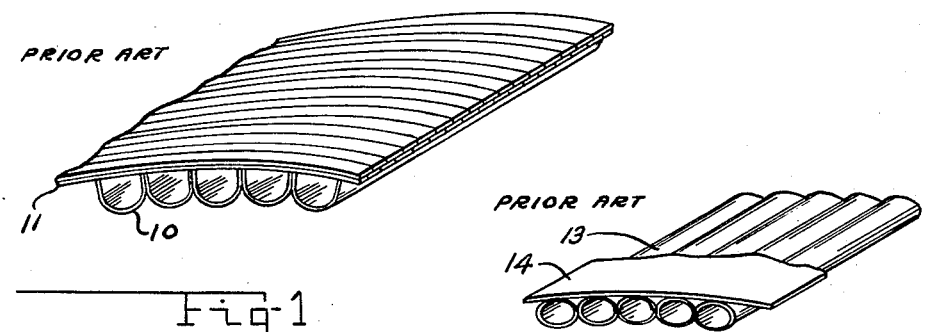
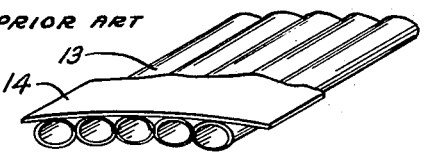
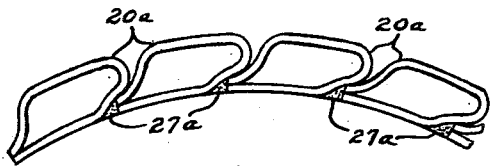
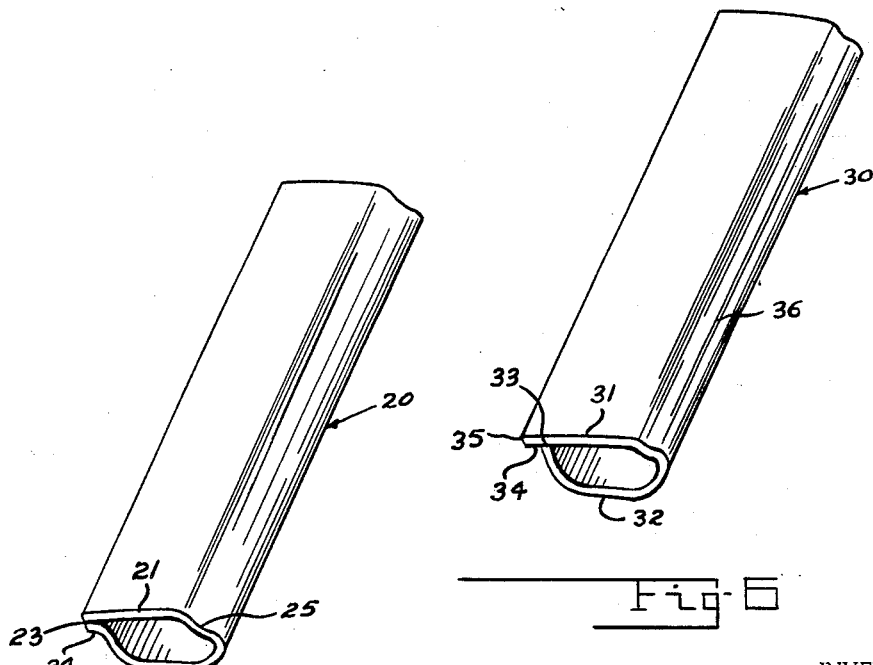
INVENTOR.
IRWIN E. ROSMAN April 13, 1965     I. E. ROSMAN     3,177,935
COOLING TUBE STRUCTURE Filed Dec. 17, 1963     2 Sheets-Sheet 2

INVENTOR.
IRWIN E. ROSMAN
BY
ATTORNEY
and
AGENT

United States Patent Office 3,177,935
Patented Apr. 13, 1965

3,177,935
COOLING TUBE STRUCTURE
Irwin E. Rosman, Woodland Hills, Calif., assignor to the United States of America as represented by the Secretary of the Air Force
Filed Dec. 17, 1963, Ser. No. 331,329
3 Claims. (Cl. 165—169)

This invention is related to actively cooled tubular structure used in hypersonic propulsion, for example, rocket thrust chambers, ramjet components and airframe structure. In order to limit the temperature levels of the material when subjecting the structure to aerodynamic or combustion temperatures higher than useful range of the materials and in most cases many times higher than their melting point, the structure is actively cooled by causing fluid to flow in channels or tubular sections.

One object of the invention is to provide cooling structure having at least one smooth wall surface and requiring less weight than prior art structure.

Another object of the invention is to provide a cooling structure having at least one smooth wall surface and which will provide good heat transfer characteristics with a minimum leakage problem.

These and other objects will be more fully understood from the following detailed description taken with the drawing, wherein:

FIG. 1 shows one prior art arrangement used for a regeneratively cooled system,

FIG. 2 shows a second prior art arrangement used for a regeneratively cooled system, FIG. 3 shows one shape of tube according to the invention for use in a regeneratively cooled system, FIG. 4 shows an end view of a plurality of tubes of FIG. 3 as they would be united for forming a thrust chamber, FIG. 5 is an end view of a segment of a thrust chamber showing an alternative shape and arrangement for the tubes of FIG. 4, and FIG. 6 shows a further modification for the tubes of FIG. 3.

In the prior art structure of FIG. 1 channel sections 10 are located adjacent the structural wall 11. The structural wall 11 is made of wire-banding which is wrapped around the channel sections 10. The fabrication of the brazed assembly of channels and wrap is quite complex. Also, the structure has the disadvantage of poor reliability because of its high leakage risk.

The prior art structure of FIG. 2 has a plurality of elliptical tubes 13 secured to a structural wall 14. This eliminates the fabrication and leakage problems but has the disavantage of poor heat transfer.

The new concept of forming the cooling tubes accordingto this invention eliminates the leakage problem, provides good heat transfer and eliminates the outer shell.

Referring to FIG. 3 of the drawing, the tube 20 has the outer and inner surfaces of outer wall 21 and an inner wall 22 formed as segments of concentric cylindrical surfaces. The metal sheet forming the tube is brought together with the inner surface joined at 23 and secured to form a seal in a manner known in the art, such as by brazing or welding. The tubes should be checked for leakage in the manner known in the art. The projection 24 acts as a mating member for an adjacent tube. An indentation 25 extending the length of the tube is adapted for receiving and supporting the projection 24 of an adjacent tube. The tubes 20 may be assembled in the manner shown in FIG. 4 and joined at 27, for example by brazing, to form a substantially cylindrical thrust chamber. The tubes 20 also get support at 28 from the adjacent tubes. The junction at 28 may also be brazed if desired. The brazing at 27 provides a substantially smooth outer surface.

FIG. 5 shows a modification of the tube shapes which may be used to provide a substantially smooth inner surface wherein tubes 20a are joined by brazing at 27a.

The tube 30 of FIG. 6 has the outer and inner surfaces of walls 31 and 32 formed as segments of concentric cylindrical surfaces as in FIG. 3. The edge 33 is brought into abutting relation with the inner surface 34 of wall 31 and secured, for example as by brazing. The wall 31 extends beyond the edge 33 to form a projection 35 which acts as a mating member for an adjacent tube. Tube 30 has an indentation 36 along its entire length which is adapted to receive the projection of an adjacent tube. The tubes 30 may be joined to form a thrust chamber in the same manner as described with respect to FIG. 4.

There is thus provided a cooling structure, which has less weight, which will provide good heat transfer characteristics and which will provide a minimum leakage problem.

While certain specific embodiments have been described in detail, numerous changes may be made without departing from the general principle and scope of the invention.

I claim:

1. A cooling structure comprising a plurality of tubular members joined together in a substantially cylindrical arrangement, each of said members having a first wall and a second wall, said walls forming segments of substantially concentric cylindrical surfaces, each of said tubes being formed from a metal sheet that has two edges which are brought together along the length of each tube to form a projection from one side of each tube, at least one surface of the projection lying along one of said concentric cylindrical surfaces, means for sealing each of said tubes along the projection therefrom, an indentation in another side of each tube, said indentation extending along the length of the tube and being remote from the projection from the same tube, and means for securing the projection from each tube to the indentation of an adjacent tube, said last-named means including a brazing material that substantially fills the space between the interfitting projections and indentations at the sides of said tubes to form a substantially smooth wall surface.

2. A cooling structure as is defined in claim 1, wherein said substantially smooth wall surface is the outer surface of said cylindrical arrangement.

3. A cooling structure as is defined in claim 1, wherein said substantially smooth wall surface is the inner surface of said cylindrical arrangement.

References Cited by the Examiner

UNITED STATES PATENTS

| 682,434 | 9/01 | Sullivan | 138—111 |
| 1,093,766 | 4/14 | Compfield | 138—156 |
| 1,608,905 | 11/26 | Murray et al. | 122—6 X |
| 2,000,906 | 5/35 | Turner | 138—111 X |
| 3,004,386 | 10/61 | Ledwith | 60—35.6 |
| 3,086,358 | 4/63 | Tumavicus | 165—169 X |

CHARLES SUKALO, *Primary Examiner.*